April 25, 1967  D. N. SCHWARDT  3,315,862
WEB DRIVE MECHANISM
Filed April 12, 1965
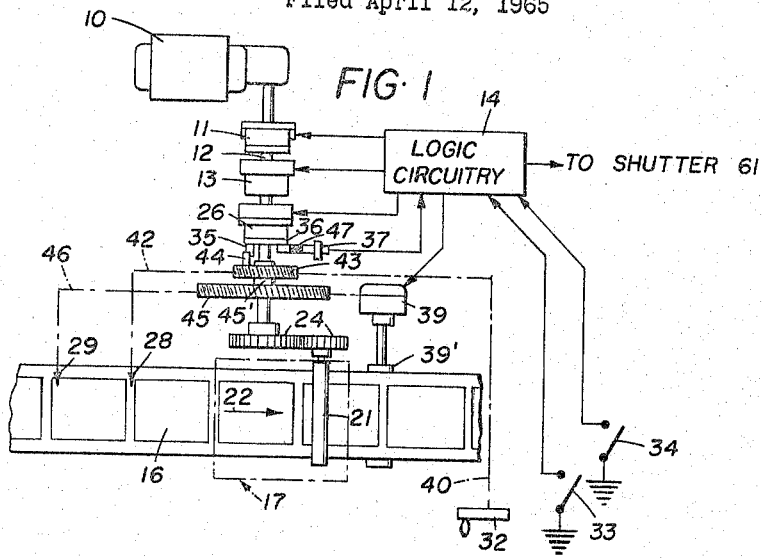
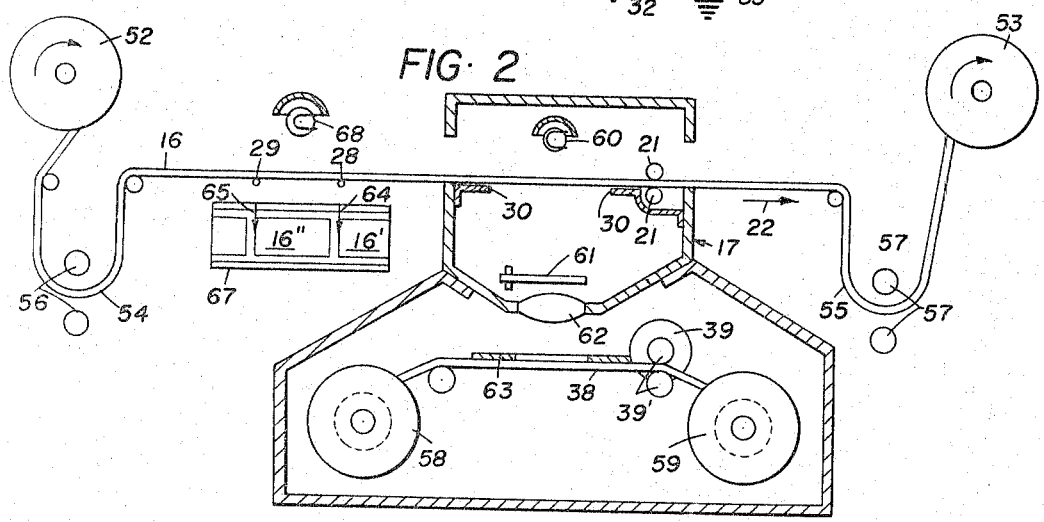
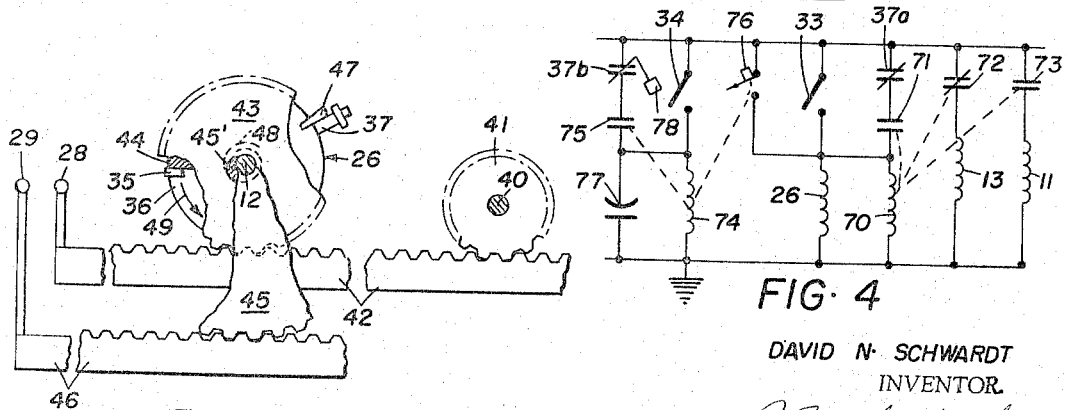
DAVID N. SCHWARDT
INVENTOR.
BY R. Frank Smith
David P. Ogden
ATTORNEYS

United States Patent Office 3,315,862
Patented Apr. 25, 1967

3,315,862
WEB DRIVE MECHANISM
David N. Schwardt, Rochester, N.Y., assignor to Eastman Kodak Company, Rochester, N.Y., a corporation of New Jersey
Filed Apr. 12, 1965, Ser. No. 447,387
6 Claims. (Cl. 226—136)

The present invention relates to a web driving mechanism and more particularly to a web drive arrangement in a photographic projection printer wherein the increments of film movement require continual surveillance and frequent adjustment.

Many automatic projection printers are known which expose a photosensitive paper web to a plurality of images by means of sequentially passing light through a series of negatives. However, since several different cameras tend to have slightly different framing apertures and driving mechanisms, it often occurs that the edges of the adjacent images are not a predetermined distance apart. Thus, it has been the practice to adjust the position of the negatives in the printing aperture to match the masking frame directly just prior to each printing operation. Also, it is necessary to classify each image to determine intensity and color corrections to obtain the best possible print. By accomplishing these adjustments while the negative is in the framing aperture, the printing cycle is slowed compared to the ability of the mechanism itself to expose individual frames and advance the film and paper. Moreover, it often occurs that one frame in a series of negatives is unprintable. Thus, the film must be advanced twice the normal distance to obtain a useful exposure of the printing paper web.

Therefore, an object of the present invention is to provide an improved web drive mechanism for a photographic projection printer film drive mechanism.

A more specific object of the present invention is to provide a projection printer film drive having a double advance feature which properly aligns a negative after having skipped one unprintable image.

In the environment of my invention the trailing edge of a negative frame to be printed in a fixed printing aperture or mask is indicated by a pointer mechanism prior to being placed in the printing aperture. The pointer mechanism is coupled to the driving mechanism of metering rollers of the film strip. The rollers are preset to advance the film along a predetermined path to the printing aperture in accordance with the positioning of the pointer. However, in accordance with my invention, if one frame of a film strip is blank, or otherwise unprintable, a second pointer is provided to align with the trailing edge of a next negative. This second pointer is exactly twice as far from the printing aperture as is the first pointer. When it is desired to use the second pointer, a double advance switch is depressed, whereupon the film drive system advances the film strip ½ of the distance to the second pointer two times prior to initiating a print exposure cycle.

The subject matter which is regarded as my invention is particularly pointed out and distinctly claimed in a concluding portion of this specification. The invention, however, as to its organization and operation, together with further objects and advantages thereof, will best be understood by reference to the following description taken in connection with the accompanying drawing, in which:

FIG. 1 is a simplified top plan view of one embodiment of my invention;

FIG. 2 is a simplified elevation view partially in section of a portion of the mechanism shown in FIG. 1;

FIG. 3 is a detailed view partially cut away of a portion of the driving mechanism shown in FIG. 1; and FIG. 4 shows a simplified schematic diagram of a portion of the logic circuitry used in this invention.

Referring now to the drawing, wherein like numbers indicate similar parts, I have shown in FIG. 1 a motor 10 couplable by a clutch 11 to drive shaft 12. In order to control the stopping of the shaft 12 quickly, there is also provided a brake means 13. It is preferred, because of inertia problems, that the motor 10 be continuously rotating and that both the clutch 11 and the brake 13 be of types, such as magnetic, which respond quickly to control signals received from logic circuitry 14. The logic circuitry of this invention utilizes relatively well known elements and need not be described in detail herein. As is normal with such circuitry, it consists of various interlocking electric elements such as switches, flip-flop circuits, "and" gates, relays and the like to obtain interdependent control signals as discussed below. Several such logic elements are well within the present state of the control art.

In FIGS. 1 and 2, I have shown a portion of a film strip 16 presentable frame by frame to a printing station 17 (indicated schematically in dashed lines in FIG. 1). During operation of this invention, the lower portion of the printing station 17 is coated internally with non-reflecting materials as are well known in this art.

Driving of the film strip 16 through the printing station 17 is accomplished by a pair of driving or metering rollers 21 which move the film as indicated by an arrow 22 when the clutch 11 is energized. Gearing 24 couples the metering rollers 21 to the drive shaft 12. A rotor of a metering clutch 26 is coupled to the shaft 12, and is also under the control of the logic circuitry 14. As explained below, the clutch 26 is energized during advance of the film strip 16 for controlling the duration of each driving operation of the metering rollers 21.

A pointer 28 and a pointer 29 are positionable one frame length and two frame lengths respectively from a printing aperture 30 (FIG. 2) within the printing station 17. The pointers 28 and 29 are positionable by and under the control of a hand operable knob 32. The operator positions pointer 29 when the frame adjacent to the printing station is unprintable. When one of the pointers is properly positioned at the trailing edge of a printable image, the operator depresses a switch 33 or a switch 34 to effect changes in the logic circuitry 14 as by energizing a relay logic element system of the type illustrated in FIG. 4 as discussed below. Such a relay system will cause selected energization of the clutches 11 and 26 and deenergization of the brake 13 whereby the rollers 21 advance the film strip 16.

The clutch 26 remains energized until a projection 35 on a face plate 36 thereof energizes a limit switch 37 which changes the state of the particular logic element (relay) in the logic circuitry 14. If the switch 33 has been energized, this simply causes the clutches 11 and 26 to be de-energized and the brake 13 to be energized to thus stop the system. However, if the switch 34 has been energized, the relay system or its equivalent in the logic circuitry 14 is operated so that the advance of the film is repeated. After the advance called for, either one or two steps, the film strip 16 is properly positioned for exposing a portion of a paper web 38 (FIG. 2) which has been advanced only one step by a drive means such as a motor 39 and drive rollers 39' operable in response to the completion of a previous printing cycle.

As shown more clearly in FIG. 3 the knob 32 rotates a shaft 40 and a gear wheel 41 secured thereto to control the position of a rack 42 which supports the pointer 28. The rack 42 also rotates a gear 43 to establish the initial position of the face plate 36 by establishing the position of an abutment 44 secured thereto. This abutment 44 engages the projection 35 during its back stroke to precisely control the starting position of the face plate 36 and thus regulate the length of its stroke.

According to my invention, the gear 43 is drivingly coupled to another gear 45 as by a hub 45' of twice the diameter of the gear 43 to drive a second rack 46 twice the distance moved by the rack 42. The pointer 29 is supported on the rack 46 and thereby is maintained exactly twice as far from the aperture 30 (FIG. 2) in the printing station 17 as is the pointer 28.

Because of possible variations in the effectiveness of the brake 13, there is provided a fixed stop 47 which precisely defines the terminal position of the projection 35 when the switch 37 is actuated. By this method both terminal positions of the projection 35 are accurately controlled.

The face plate 36 is also provided with spring means 48 (FIG. 3) coupling it to a stationary member thereby or to the gear 43 as indicated in dashed lines. The spring 48 returns the face plate 36 to its starting position upon release of energization of clutch 26 and after it has moved its full stroke in the direction indicated by an arrow 49. Although the gears 43 and 45 are journaled on the shaft 12 so that they are coaxial with the face plate 36, they are not secured thereto and rotate independently thereof. Similarly, the face plate 36 of the clutch 26 rotates independently of the shaft 12 when the rotor of the clutch 26 is released. As mentioned above, the clutch rotor itself is secured to the shaft 12 and rotates therewith.

Referring now to FIG. 4, I have illustrated a simplified relay system for the single and double advance operation discussed above. As illustrated, the switch contact 33 momentarily energizes the clutch 26 and a relay 70. The relay 70 operates contactors 71, 72 and 73 to hold itself and the clutch energized, to de-energize the brake 13, and to energize the clutch 11 respectively. When the switch 37 is activated, a contactor 37a is opened to cause these elements to return to the standby condition illustrated.

When switch 34 is closed, it momentarily energizes a relay 74. The relay 74 has a self-holding contact 75 in series with contactor 37b and a wiping or momentary contactor 76 which shunts switch contactor 33 each time the relay 74 is opened or closed. Thus when the relay 74 is initially energized, the driving of the above described portion of the relay system operates as if switch 33 had been closed.

However, when the contactor 37b is opened to de-energization of the relay 74, opening is delayed by a current flow from a capacitor 77 until the face plate 36 has had time to respond to the spring 48. After this delay the wiping contactor 76 again initiates advance of the film strip 16 during opening of the relay 74. After the delay caused by the capacitor 77, the contactor 37b is allowed to close. This delay of closing may result from a simple dashpot delay means 78 or by other logic circuit elements not illustrated.

Referring again to FIG. 2, the film drive system includes a supply reel 52 and a take-up reel 53 which are separately driven to maintain "dancer" loops 54 and 55 respectively between loop sensing devices 56 and 57 respectively whereby the driving of the film strip 16 between rollers 21 is not affected by the mass of the supply and take-up reels. Similarly, supply and take-up reels 58 and 59 are provided for the paper web 38. Also, a lamp 60 illuminates the particular frame as masked by the aperture defining member 30, and when the shutter 61 is opened by a signal from the logic circuitry 14, a lens 62 projects this illuminated image onto an unexposed region of the printing paper web 38 within a mask 63.

As discussed in connection with FIGS. 1 and 3 the control knob 32 regulates the location of the pointers 28 and 29. During positioning, reflections 64 and 65 of the pointers 28 and 29 respectively are viewed in a mirror 67 with illumination being provided by a lamp 68. Since the light from the lamp 68 passes through the film strip 16, it also projects two negative images 16' and 16" on the mirror 67. In such cases as the image 16' is seen to be unprintable, the double advance switch 34 of my invention is depressed.

While I have shown a particular embodiment of this invention, modifications thereof will occur to those skilled in this art. I intend, therefore, to have the appended claims cover such embodiments as properly fall within the scope of the present invention.

I claim:
1. A film metering device for selectively driving a film strip along a preselected path past a printing aperture comprising:
   a film drive means;
   a first pointer;
   a second pointer;
   linkage means for adjusting the location of said first and second pointers along the path of the film strip being presented to the printing aperture so that said second pointer is always twice the distance of said first pointer from the printing aperture;
   first circuit means for controlling said drive means to advance the film the distance corresponding to the spacing of said first pointer from the aperture; and
   other circuit means operable for controlling said first circuit means to advance the film strip twice the distance of said first pointer when an unprintable negative is detected adjacent to the printing aperture.
2. A film metering device as in claim 1 wherein means are provided for illuminating the film strip prior to its being driven to the printing aperture whereby said pointers are visibly discernable, and said linkage means includes an adjustment knob for moving said pointers selectively into alignment with an edge of a printable image frame of the film illuminated.
3. A film metering device as in claim 1 wherein said linkage means comprises:
   a first rack supporting said first pointer;
   a second rack supporting said second pointer; and
   gearing coupling said first rack and said second rack so that said second rack is always moved twice the distance of said first rack.
4. A film metering device for driving a film strip along a preselected path into a printing aperture comprising:
   means for illuminating a pre-selected portion of the film path;
   a first pointer positioned to be illuminated by said means;
   a second pointer positioned to be illuminated by said means;
   support means for movably supporting both of said pointers and including linkage means for controlling their position along the preselected path so that said second pointer is always twice the distance of said first pointer from the printing aperture;
   means operable to drive the film the distance corresponding to the spacing of said first pointer from the aperture; and
   means operable selectively to drive the film strip twice the distance of said first pointer when an unprintable negative is detected adjacent to the printing aperture.
5. A film metering device as in claim 4 wherein said linkage means includes an adjustment knob for moving said pointers selectively into alignment with a trailing edge selectively of one of the image frames of the film illuminated and adjacent to the printing aperture.
6. A film metering device as in claim 4 wherein said linkage means comprises a first rack supporting said first pointer;
   a second rack supporting said second pointer; and
   gearing drivable during the positioning of said first rack and arranged to drive said second rack so that said second pointer is adjustable twice the distance of said first pointer.

(References on following page)

References Cited by the Examiner

UNITED STATES PATENTS

| | | | |
|---|---|---|---|
| 2,657,613 | 11/1953 | Maker et al. | 88—24 |
| 2,832,591 | 4/1958 | Fillingame | 226—141 |
| 3,163,344 | 12/1964 | Kallenberg | 226—141 |

FOREIGN PATENTS 670,783  4/1952  Great Britain.

References Cited by the Applicant

UNITED STATES PATENTS

| | | |
|---|---|---|
| 2,578,300 | 12/1951 | Hausman. |
| 2,601,356 | 6/1952 | Ackell. |

EVON C. BLUNK, *Primary Examiner.*

A. C. HODGSON, *Assistant Examiner.*